United States Patent [19]

Wojnarowicz

[11] Patent Number: 5,149,592
[45] Date of Patent: Sep. 22, 1992

[54] ULTRAVIOLET RADIATION CURABLE CLEARCOAT

[75] Inventor: Mitchell F. Wojnarowicz, Chicago, Ill.

[73] Assignee: Avery Dennison Corporation, Pasadena, Calif.

[21] Appl. No.: 650,579

[22] Filed: Feb. 4, 1991

Related U.S. Application Data

[63] Continuation-in-part of Ser. No. 521,245, May 9, 1990, abandoned.

[51] Int. Cl.$^5$ .................. B32B 27/30; B32B 27/16
[52] U.S. Cl. .................... 428/447; 428/424.6; 522/91; 522/75; 522/77; 522/79; 526/279; 526/301
[58] Field of Search ............... 526/279, 301; 524/730, 524/731; 522/91, 99; 428/424.6, 447

[56] References Cited

U.S. PATENT DOCUMENTS

| | | | |
|---|---|---|---|
| 3,965,057 | 6/1976 | Ammons et al. | 524/730 X |
| 4,081,421 | 3/1978 | Yoshida | 524/730 |
| 4,216,267 | 8/1980 | Lorenz et al. | 524/730 X |
| 4,463,149 | 7/1984 | Ellis | 526/279 |
| 4,717,739 | 1/1988 | Chevreux et al. | 526/301 X |
| 4,753,860 | 6/1988 | Hung et al. | 430/18 |

OTHER PUBLICATIONS

Radcure Specialties, datasheet for "Ebecryl 19-6350".
B. Martin "Acrylated Polyurethane Oligomers" pp. 4–16, *Radiation Curing*, Aug. 1986.

*Primary Examiner*—Joseph L. Schofer
*Assistant Examiner*—M. Nagumo
*Attorney, Agent, or Firm*—Christie, Parker & Hale

[57] ABSTRACT

A flexible glossy coating adherent to polyvinyl chloride for fleet marketing applications which comprises a backbone of cured polymer comprising from about 40 to 80 percent by weight a total of about at least one aliphatic urethane diacrylate normally provided as an oligomer and a total of from about 60 to about 20 percent by weight of a monofunctional component and from 0.5 to 6 percent by weight of an organosilicone component.

13 Claims, 1 Drawing Sheet

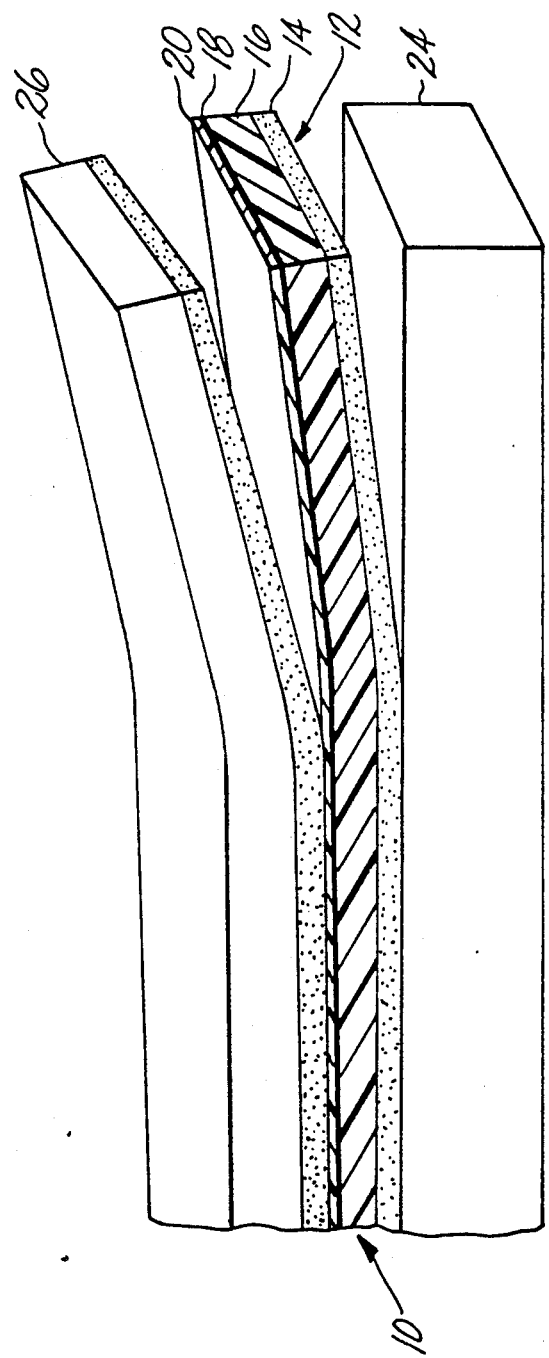

ULTRAVIOLET RADIATION CURABLE CLEARCOAT

CROSS REFERENCE TO RELATED APPLICATION

This is a continuation-in-part of application Ser. No. 07/521,245, abandoned, filed May 9, 1990, incorporated herein by reference.

FIELD OF THE INVENTION

The invention relates to the field of weatherable cured clearcoats for flexible polymeric films used in fleet marking applications.

BACKGROUND OF THE INVENTION

Fleet marking applications are applications where a film having a pressure-sensitive adhesive on one side and some intelligent indicia on the opposed side is applied to sides of vehicles such as trucks or trailers, cabs, automobiles and the like. The sides of the vehicles, when the films are applied, may be riveted, seamed, sharply curved, corrugated and the like. The film, therefore, must be sufficiently flexible to conform to the irregularities without cracking or breaking. The pressure-sensitive adhesive must also be sufficiently aggressive to conform to irregular surfaces without separation or lifting.

Polyvinyl chloride films are typically used for fleet marking applications. The polyvinyl chloride film is printed with inks, normally "vinyl inks" by screen printing techniques and the like. They include metallic inks. It has been known to provide a protective top coat or clearcoat over the applied inks to be protective and, if desired, also decorative. The clearcoats have been based on aliphatic urethane diacrylate oligomers and phthalic acid ester plasticizer, used with or without the addition of polyvinyl pyrrolidone. Such compositions have been found to rapidly degrade upon exposure to natural light as indicated by a loss in gloss.

SUMMARY OF THE INVENTION

The present invention is directed to curable clearcoat compositions, which exhibit the characteristics necessary for a clearcoat on flexible polymeric films including polyvinyl chloride films used for fleet marking applications and which exhibit exceptional environmental properties including excellent weathering properties, as evidence by gloss retention high elongation and gasoline resistance as evidenced by resistance to delamination.

Clearcoat compositions of the invention are based on the combination of at least one aliphatic urethane diacrylate and at least one monofunctional monomer, which combination is curable by at least actinic radiation preferably ultraviolet (UV) radiation in the presence of a photoinitiator. This combination provides a polymerizable base system which preferably also comprises light stabilizer, a phenolic antioxidant agent and a organo silicone preferably a reactive acrylic functional silicone alone or with other non reactive silicones which promote coatability. Non-yellowing photoinitiators are preferably provided for UV cure. Electron beam cure is also feasible.

More particularly, the formulation comprises cured polymers comprising a total of from about 40 to about 80, preferably about 50 to about 70, percent by weight of an at least one aliphatic urethane diacrylate, normally provided as an oligomer, and a total of from about 20 to about 60, preferably 30 to about 50, percent by weight of a monofunctional compound based on the weight of the aliphatic urethane diacrylate and monofunctional compound. The monofunctional compound is preferably a substituted or unsubstituted cycloaliphatic or aliphatic acrylate and/or methacrylate, preferably a monofunctional aliphatic urethane acrylate. The reaction mixture, on cure, forms a flexible and weatherable topcoat for flexible polymeric film applications, exhibiting excellent adhesion to a vinyl chloride/vinyl ink surface and resistance to gasoline and other fuels. Preferably, the mixture is UV cured in the presence of a photoinitiator, preferably an acetophenone, which is highly efficient in promoting cure and which provides a non-yellowing product having a good balance of both surface and cure through the body of the coating.

Photoinitiators typically comprise from 0.5 to about 5 percent by weight based on total weight of the coating compositions. A tertiary amine light stabilizer is preferably employed to enhance the weatherability, typically provided at a concentration of 0.5 to about 3 percent by weight of the compositions. Antioxidants, preferably phenolic, are present in about 0.1 to about 0.5 percent by weight of the reactants and are used to stabilize against thermal oxidative degradation. Processability such as flow prior to cure may be enhanced by the inclusion of about 0.5 to about 6.0, preferably 0.5 to 4, percent by weight of an organosilicone which can also positively influence gloss and adhesion. Coating may also be enhanced by inclusion of a fluorinated surfactant.

The composition, when coated, may be cured on exposure to UV radiation, preferably by a mercury vapor lamp, radiating at a 250–450 nm wave length range. The cure preferably occurs in an inert atmosphere, although cure in air is also feasible. It is also feasible to utilize other means of cure, such as electron beam (EB) radiation.

BRIEF DESCRIPTION OF THE DRAWINGS

The attached drawing depicts a cross section of a product using the curable clearcoat of the invention.

DETAILED DESCRIPTION

With reference to the attached Drawing, the end product employing the invention consists of a laminate 12 of a pressure-sensitive adhesive 14, a flexible polymeric film substrate 16, ink indicia 18, and cured clearcoat 20 laminated between a silicone coated release liner 24 and a removable premask 26. The silicone release liner 24 protects the pressure-sensitive adhesive until the fleet marking layer is applied onto a substrate, typically a vehicle side, and discarded at the time of application. Premask 26 is typically a nonwoven material lightly bonded to the clearcoat and is used as a layer to protect the clearcoat 20 during application. After the combination is applied to a receiving surface, the premask 26 is also removed and discarded. What remains on the substrate is the laminate of the pressure-sensitive adhesive, the flexible film 16, intelligent indicia 18 protected by a cured clearcoat 20, which is the subject of this invention.

The present invention is directed to flexible clearcoat compositions having improved resistance to weathering as evidenced by retention of gloss and which meet the mechanical and chemical requirements for fleet marking applications using flexible polymeric films including polyvinyl chloride films.

The physical properties which are critical to clearcoat performance are outdoor weatherability, flexibility for conforming to irregularities, adhesion to polyvinyl chloride throughout its lifetime, high gloss retention, low shrinkage, abrasion resistance, and gasoline or fuel resistance. The formulation must also have a workable viscosity to enable clearcoating application by screen, roller coating, and like techniques. Coefficient of expansion must also be compatible with polyvinyl chloride so as to prevent delamination, and/or wrinkling in consequence of differential expansion and contraction.

The preferred polyvinyl chloride films are typically made of filled and unfilled polyvinyl chloride. The inks are inks which aggressively adhere to a vinyl surface and are typically known as "vinyl inks" and include metallic inks. Pressure-sensitive adhesives are those which weather well and provide an excellent bond to both the film and substrate to which the laminate is applied.

The pressure-sensitive adhesives are preferably solvent-based acrylic pressure-sensitive adhesives. Other pressure-sensitive adhesive systems such as emulsion and bulk polymerized adhesives may also be used.

The clearcoat formulation of the instant invention comprises a curable mixture of at least one aliphatic urethane diacrylate normally provided as an oligomer and at least one monofunctional monomer, preferably saturated aliphatic or cycloaliphatic acrylate or methacrylate and most preferably a monofunctional aliphatic urethane acrylate. The cured aliphatic urethane acrylate/monofunctional monomer mixture forms the backbone of the clearcoat. The mixture may further comprise a photoinitiator, a hindered amine light stabilizer, and a phenolic antioxidant, the functions of which will be hereinafter explained. A highly desired constituent is an organosilicon compound which contributes to flow, slip and/or wettability.

Preferably, the backbone polymer comprising a total of from about 40 to about 80 percent by weight, preferably about 50 to about 70 percent by weight, aliphatic urethane acrylate preferably having a molecular weight in the range of about 1000 to about 3000 and a viscosity of about 1000 to about 15,000 centipoise at about 150° F.

The presently preferred aliphatic urethane acrylates are oligomers such as Ebecryl ® 8806, having an average molecular weight of about 2,000 and a viscosity of about 10,500 centipoise, at 150° F. and manufactured and sold by Radcure Specialties, Inc. and Photomer ® 6210 an aliphatic urethane acrylate oligomer having a molecular weight of about 1400, a viscosity of about 1500 centipoise at about 160° F. and manufactured and sold by Henkel Corporation.

The second component of the backbone is at least one monofunctional substituted or unsubstituted aliphatic or cycloaliphatic acrylate or methacrylate including acrylate and methacrylate functional urethane containing typically from 2 to about 10 carbon atoms in the acrylate or methacrylate group, such as cyclohexyl acrylate, cyclohexyl methacrylate, 2-methoxyethyl acrylate, 2-methoxyethyl methacrylate, 2-ethylhexyl acrylate, iso-octyl acrylate and like. The monofunctional monomer imparts flexibility and weatherability to the clearcoat and excellent adhesion to the flexible film. The second component is present in a total concentration of about 20 to about 60, preferably about 30 to about 50 percent by weight based on the mixture of the reactive components. The presently preferred monofunctional acrylate is Genomer ® M220 a monofunctional aliphatic urethane acrylate having a molecular weight of 215 and a viscosity of 20-50 mPa.s at 25° C. which is sold by Hans Rahn and Company of Zurich. The cured compositions are inherently flexible. However, flexibility may also be enhanced or modified by the addition of a plasticizer.

The compositions of this invention may be cured by electron beam ("EB") or actinic radiation and are preferably cured by UV radiation in the presence of a photoinitiator. Presently preferred photoinitiators are hydroxycyclohexyl phenyl ketone, a substituted acetophenone, and 2-hydroxy-2 methyl-1 phenyl-propa-1-one. They and any photoinitiators used should be non-yellowing and provide a good balance of surface and body cure. The photoinitiator typically comprises from about 0.5 to about 4 percent of the total composition. UV intensity typical for a coating of 0.2 to 0.5 mil thick, is approximately 350 millijoules/cm$^2$.

Hindered tertiary amine light stabilizers are normally included to further aid in weatherability. The presently preferred stabilizer is bis 1, 2, 2, 6, 6-penta methyl-4-piperidinyl sebacate (HALS) normally provided in a concentration of about 0.5 to about 2 percent by weight of the total composition.

To enhance flow and wetting during coating operations and final gloss and adhesion it is desired to include an organosilicone which may be non-reactive such as polydimethylsiloxane, or reactive such as silicone polyacrylate and the like as part of the composition, typically at a level of about 0.5 to about 6, preferably about 0.5 to about 4, percent of weight based on the total weight of the composition.

Antioxidants may be added to stabilize the coating against thermal oxidation. In this regard, phenolic antioxidants such as Irganox ® 1010, present in a concentration of about 0.1 to about 0.5 percent by weight based on the weight of the composition, may be typically used.

There are several methods for providing cured clearcoating. They include screen printing and roller coating of the vinyl with the curable composition. Viscosity is adjusted to the method of coating used. In screen printing the clearcoat, the squeegee and screen mesh, typically 245-465 mesh, are chosen so that a coating thickness of about 0.2 to about 0.5 mil is deposited over the vinyl and vinyl ink graphics.

Curing of the coating containing a UV initiator may be by medium pressure mercury vapor lamps which have an emission between 250-450 nm. The amount of UV energy necessary to cure the coating was measured at 350 millijoules/cm$^2$. Using the above techniques, the compositions of Table I were coated onto a polyvinyl chloride film and cured by exposing the coating to two 100 watts/in lamps for 12 seconds.

Curing was preferably conducted in an inert nitrogen atmosphere. This was done to prevent oxygen inhibition at the film's surface, as oxygen can combine with photoinitiator radicals which are, in turn, reduced to hydroperoxides to yield short chained tacky polymers.

The cured samples (Examples 1 to 4) were compared for product performance against a clearcoat based on a aliphatic urethane acrylate oligomer, a phthalic acid plasticizer and vinyl pyrrolidine (Control). The test results are reported in Table II.

Accelerated Weatherability

In coating and curing the UV clearcoating on vinyl, the film is adhered to aluminum panels and tested in a Xenon Arc WOM for its weatherability per SAE J1960. The panels are periodically checked for gloss retention, shrinkage, yellowing, cracking, crazing, pitting and adhesion to vinyl.

Percent Elongation

The flexibility of the film is measured by testing the percent elongation of a one inch wide strip of clearcoated vinyl film. The material is placed in the jaws of a tensile and elongation tester at a two inch gap. Rate of jaw separation is 12 in/min. elongation is recorded at break point.

Adhesion to Vinyl

To determine adhesion, ten equally spaced lines 1/8 inch apart were cut perpendicular to each other to form uniform squares. Scotch Brand 610 tape was applied to the scribed area, squeegeed down, and rapidly pulled away from the coating three times. Failure was recorded as the percent of squares which were pulled off by the tape (ASTM D-3359-83). Adhesion was tested throughout the accelerated weathering of the film.

Gasoline Resistance

Five drops of unleaded gasoline are allowed to dwell over a clearcoated/vinyl ink printed portion of the film. The section is then given twenty-five double rubs with a cotton cloth using moderate hand pressure. Clearcoat is then checked for any signs of breakthrough.

Tabor Abrasor

The abrasion resistance of the clearcoat is tested using a Tabor abrasor equipped with CS-17 wheels each under a 500 g load. Coating fails once the wheels have broken through to the vinyl film. Number of cycles are recorded.

Gloss

Gloss of the clearcoats was measured using a Pacific Scientific 20° Glossmeter.

TABLE I

| Component | Ex 1 | Ex 2 | Ex 3 | Ex 4 |
| --- | --- | --- | --- | --- |
| Aliphatic Urethane Diacrylate | | | | |
| Ebecryl ® 8806 | 55.7 | 55.7 | 63.0 | — |
| Photomer ® 6210 | — | — | — | 53.0 |
| Monofunctional monomer | | | | |
| Isooctyl acrylate | 40.4 | — | — | — |
| Cyclohexyl acrylate | — | 40.4 | — | — |
| 2-methoxyethyl acrylate | — | — | 32.6 | — |
| Genomer ® 220 | — | — | — | 40.5 |
| Photoinitiator | 1.1 | 1.1 | 1.1 | 1.0 |
| Organosilicone | | | | |
| Non reactive, | 1.4 | 1.4 | 1.4 | 0.8 |
| Reactive, | — | — | — | 3.0 |
| Antioxidant | .3 | .3 | .3 | .3 |
| Surfactant | — | — | — | 0.4 |
| Hindered Amine | 1.1 | 1.1 | 1.1 | 1.0 |
| | 100.0 | 100.0 | 100.0 | 100.0 |

The presently preferred composition as exhibiting the best overall balance of properties, exceptional gasoline resistance and processability with the exception that elongation is the composition in which the organosilicon is predominantly a silicone polyacrylate and the composition of Example 4.

TABLE II

| | Tnsl lb/in | % El | Vinl Adh | Tabor Abrs | Gas Rb Resist | Orig Gloss | % Gloss Retention WEATHERMETER Exposure, Hours | | | | |
| --- | --- | --- | --- | --- | --- | --- | --- | --- | --- | --- | --- |
| | | | | | | | 500 | 250 | 750 | 1000 | 1500 |
| Ex. 1 | 8.5 | 120 | Pass | 300 | Fair | 72 | 90 | 95 | 85 | 80 | 60 |
| Ex. 2 | 8.5 | 85 | Pass | 800 | Exc | 75 | 75 | 95 | 65 | 55 | — |
| Ex. 3 | 8.5 | 105 | Pass | 400 | Exc | 73 | 85 | 95 | 70 | 60 | 30 |
| Ex. 4 | 8.5 | 120 | Pass | 400 | Exc | 75 | 100 | 100 | 95 | 95 | 60 |
| Control | 8.5 | 80 | Pass | 400 | Exc | 76 | 100 | 100 | 95 | 60 | — |

What is claimed is:

1. A flexible glossy, cured, coating adherent to a flexible substrate said adherent cured coating comprising a polymer component containing, based on the weight of the polymer component from about 40 to about 80 percent by weight total of at least one aliphatic urethane diacrylate having an average molecular weight of about 1000 to about 3000 and a viscosity of about 1000 to about 15,000 centipoise at about 150° to 160° F. and from about 60 to about 20 percent by weight of a monofunctional urethane acrylate and containing, based on the weight of the cured coating, from 0.5 to about 6 percent by weight of an organosilicone component which comprises a reactive silicon polyacrylate.

2. A flexible, glossy, cured coating as claimed in claim 1 in which the aliphatic urethane diacrylate is present in an amount of from about 50 to 70 percent by weight the polymer component and in which the monofunctional urethane acrylate is present in an amount of rom about 50 to 30 parts by weight of the polymer component.

3. A flexible, glossy, cured coating as claimed in claim 1 in which the monofunctional urethane acrylate is an aliphatic urethane acrylate having a molecular weight of 215 and a viscosity of 20–50 mPa.s at 25° C.

4. A flexible, glossy, cured coating as claimed in claim 1 in which the organosilicone component further comprises a polydimethyl siloxane.

5. A flexible, glossy, cured coating as claimed in claim 3 in which the organosilicone component further comprises a polydimethyl siloxane.

6. A flexible, glossy, cured coating as claimed in claim 1 further comprising, based on the weight of the cured coating of from about 0.5 to about 2 percent by weight of a tertiary amine and, from about 0.1 to about 0.5 percent by weight of a phenolic antioxidant and in which the organosilicone component further comprises a polydimethyl siloxane.

7. A flexible, glossy, cured coating as claimed in claim 3 which further comprises, based in the weight of the cured coating of from about 0.5 to about 2 percent by weight of a tertiary amine and, from about 0.1 to about 0.5 percent by weight of a phenolic antioxidant and in which the organosilicone compound further comprises a polydimethyl siloxane.

8. A flexible, glossy, cured coating as claimed in claim 1 in which the coating is cured by ultraviolet radiation.

9. A flexible, glossy, cured coating adherent to a flexible vinyl substrate and formed by ultraviolet radiation curing a composition comprising:
   a) from about 40 to about 80 percent by weight of an aliphatic urethane diacrylate having an average molecular weight of about 1000 to about 3000 and a viscosity of about 1000 to about 15,000 centipoises at about 150° to 160° F.;
   b) from about 60 to about 20 percent by weight of the coating of a monofunctional urethane acrylate;
   c) from about 0.5 to about 2 percent by weight tertiary amine,
   d) from about 0.1 to about 0.5 percent by weight of a phenolic antioxidant, and
   e) from 0.5 to about 6 percent by weight of an organosilicone component comprising a reactive silicone polyacrylate and polydimethyl siloxane.

10. A flexible, glossy, cured coating as claimed in claim 9 in which the ultraviolet radiation cure occurs in the presence of from about 0.5 to about 4 percent by weight of a photoinitiator selected from hydroxycyclohexyl phenylketone and 2-hydroxy-2-methyl-1-phenylpropa-1-one.

11. A flexible, glossy, cured coating as claimed in claim 9 in which the aliphatic urethane diacrylate is present in an amount of from about 50 to 70 percent by weight the cured coating and in which the monofunctional urethane acrylate is present in an amount of from about 50 to 30 parts by weight of the cured coating.

12. A flexible, glossy, cured coating as claimed in claim 9 in which the monofunctional urethane acrylate is a monofunctional aliphatic urethane acrylate having molecular weight of 215 and a viscosity of 20 to 50 mPa.s at 25° C.

13. A flexible, glossy, cured coating as claimed in claim 8 further comprising based on the weight of the cured polymer coating of from about 0.5 to about 2 percent by weight of a tertiary amine and, from about 0.1 to about 0.5 percent by weight of a phenolic antioxidant and in which the organosilicone component further comprises a polydimethyl siloxane.

* * * * *

UNITED STATES PATENT AND TRADEMARK OFFICE
CERTIFICATE OF CORRECTION

PATENT NO.  : 5,149,592

DATED       : September 22, 1992

INVENTOR(S) : Mitchell F. Wojnarowicz

It is certified that error appears in the above-identified patent and that said Letters Patent is hereby corrected as shown below:

Column 1, line 59, before "organo" change "a" to -- an --.

Column 2, line 41, change "DRAWINGS" to -- DRAWING --.

Column 3, line 63, before "like" insert -- the --.

Column 4, line 65, after "based on" change "a" to -- an --.

Column 5, line 15, change "elongation" to -- Elongation --.

In the Claims

Column 6, line 47, change "rom" to -- from --.

Signed and Sealed this

Sixteenth Day of November, 1993

Attest:

BRUCE LEHMAN

Attesting Officer    Commissioner of Patents and Trademarks